Figure 1:
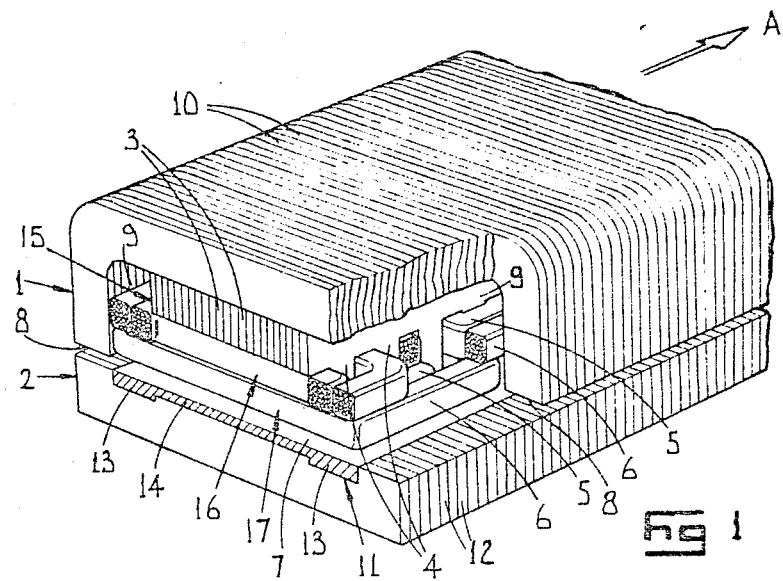

United States Patent
Eastham

[15] 3,644,762
[45] Feb. 22, 1972

[54] LINEAR INDUCTION MOTOR STATOR

[72] Inventor: John Frederick Eastham, Long Ditton, England

[73] Assignee: Tracked Hovercraft Limited, London, England

[22] Filed: Feb. 22, 1971

[21] Appl. No.: 117,461

[30] Foreign Application Priority Data

Feb. 27, 1970 Great Britain..................9730/70

[52] U.S. Cl..........................310/13, 310/203, 104/148
[51] Int. Cl.......................................................H02k 41/04
[58] Field of Search.................................310/12–14, 198, 310/202–207, 166

[56] References Cited

UNITED STATES PATENTS 1,950,627  3/1934  Parvin...................................310/13 X
2,989,654  6/1961  Neyhouse et al....................310/203 X
3,335,300  8/1967  Von Brimer............................310/13

Primary Examiner—D. F. Duggan
Attorney—Cameron, Kerkam and Sutton

[57] ABSTRACT

A linear induction motor has a polyphase energizing winding formed of groups of generally flat bobbin-type windings arranged in two or more winding layers, the windings in each winding layer being generally coplanar with one another. Each winding group is formed of two or more of the windings one within the other. In each group the innermost winding encompasses one or more teeth of the primary member magnetic material, the next winding encompasses that tooth together with at least one of the adjacent teeth, and so on.

21 Claims, 15 Drawing Figures

LINEAR INDUCTION MOTOR STATOR

This invention relates to polyphase linear induction motors.

The invention is of particular relevance to polyphase linear induction motors for high-speed transport systems, in which vehicles such as air cushion vehicles are operated at high speeds (e.g., more than 200 k.p.h.) over a prepared track. In such an application the motor primary member or "stator" is usually carried by the vehicle, and the secondary member or "rotor" (which is at least partly formed of electrically conductive material) extends along the track; the reverse arrangement is, however, possible. Energization of the polyphase winding on the primary member from a polyphase AC supply produces propulsive force for driving the vehicle along the track.

The polyphase windings hitherto proposed for linear induction motors have been formed of windings having cranked winding ends. The cranking of the winding ends is expensive and has the added disadvantage that the winding tends to be bulky at its winding ends. This latter disadvantage is particularly relevant to very high-speed transport systems, where space is usually at a premium.

In copending application Nos. 33596 and 47080, applicants show a linear induction motor having a polyphase energizing winding formed of simple bobbin-type windings which are spaced apart longitudinally of the primary member. Because of the absence of cranked winding ends such an arrangement is inherently less bulky than those hitherto proposed but has been found to give a motor performance which is considerably inferior to the performance expected. One object of the present invention is to provide a linear induction motor having a polyphase energizing winding which may be formed from simple bobbin-type windings and yet which gives a more satisfactory motor performance.

According to the present invention there is provided a linear induction motor comprising a primary member and a secondary member arranged transversely of one another for relative longitudinal movement therebetween, said primary member comprising magnetic material having a plurality of teeth spaced longitudinally of the motor in opposition to the secondary member and separated from one another by winding slots therebetween, and polyphase energizing winding means for the motor, the winding means comprising, for each phase and for each pole pair of the motor in operation, a plurality of winding groups arranged in at least two winding layers and each comprising at least two windings arranged one within the other, of each two successive windings of each winding group the inner one encompassing at least one of the teeth for generating magnetic flux therein and the outer one encompassing each said tooth encompassed by the inner winding together with at least one of the two adjacent teeth for generating magnetic flux therein, each winding being at least substantially planar and in each winding layer the constituent windings lying at least substantially in a common plane.

Each winding layer may be formed of winding groups belonging to a single phase of the winding means, or it may be formed of winding groups of the phases taken in rotation. A further possibility is a winding layer formed of winding groups from two or more, but not all, of the phases of the polyphase winding.

The windings of a group may have equal numbers of winding turns or their numbers of winding turns may differ.

The winding groups may be connected in parallel, series-parallel or series to further such winding groups in the same phase.

Within each winding group the windings are most likely to be connected in series, but parallel connection is possible.

The teeth may be provided by a magnetic structure which extends continuously along the primary member in spaced opposition to the secondary member or they may be provided by parts opposed to the secondary member of a plurality of transversely extending and longitudinally spaced magnetic structures, the spaces between the structures constituting the winding slots.

In the former arrangement of the preceding paragraph the primary member magnetic material may include a further magnetic structure which provides in combination with the first-mentioned magnetic structure part of a transverse path for working flux which is in addition to the longitudinal path provided in part by the first magnetic structure; likewise in the latter arrangement, where each magnetic structure provides part of a transverse path for working flux, the primary member magnetic material may include one or more further parts which magnetically bridge the spaces between the magnetic structures and so form part of a longitudinal path for working flux.

By "working flux" throughout the specification and claims is means flux which is created by the travelling field of magnetomotive force set up by the polyphase energizing winding and which, in passing in a closed magnetic path linking the primary and secondary members, produces propulsive force by interaction with currents which it induces in the electrically conductive material of the secondary member.

The secondary member of a motor in accordance with the invention may be of any suitable type which, according to the arrangement adopted, may or may not include magnetic material.

Figure 2:
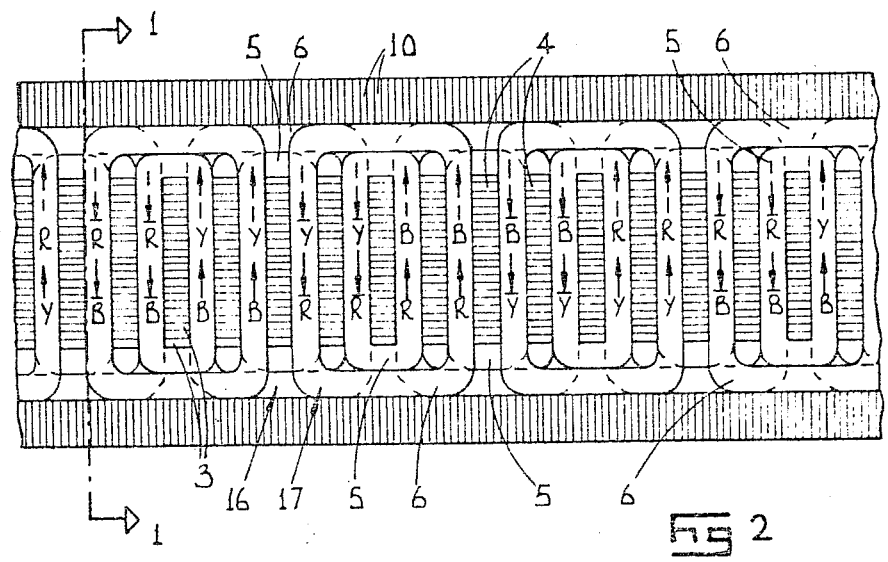
Figure 3:
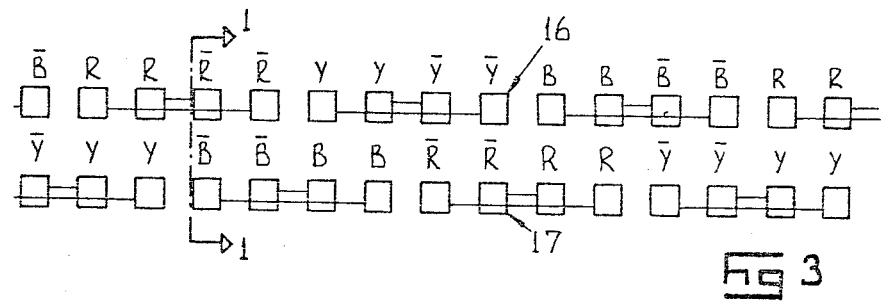
Figure 4:
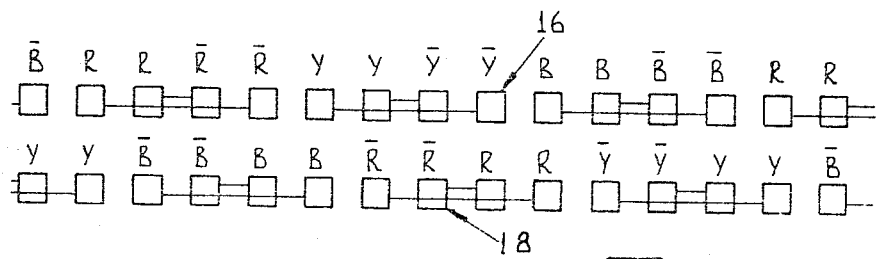
Figure 6:
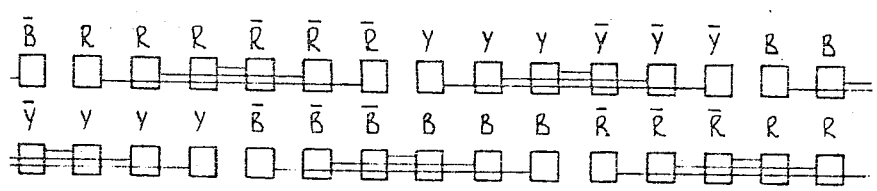
Figure 7:
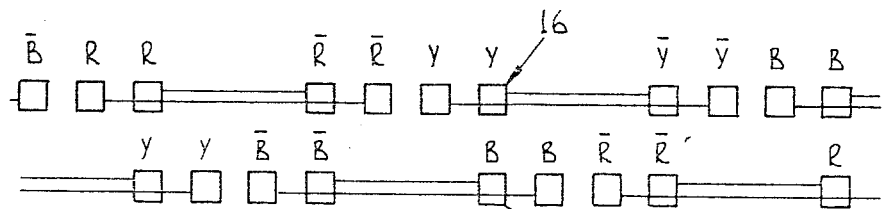
Figure 8:
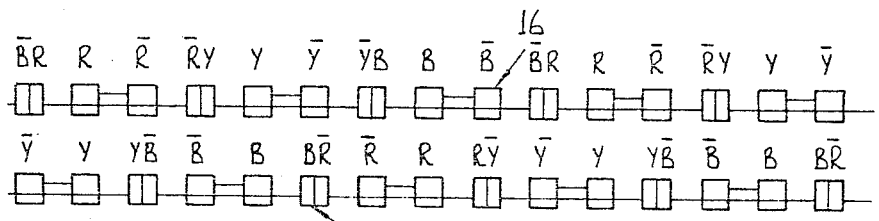
Figure 9:
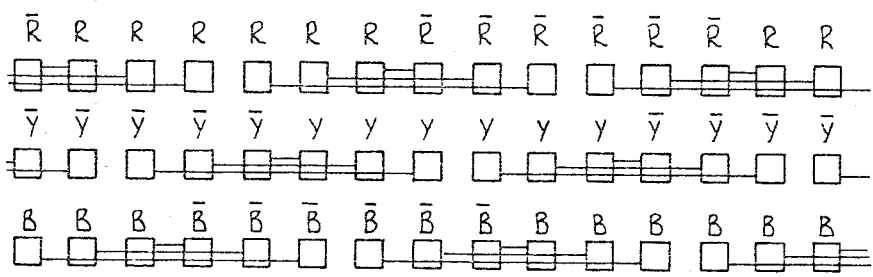
Figure 10:
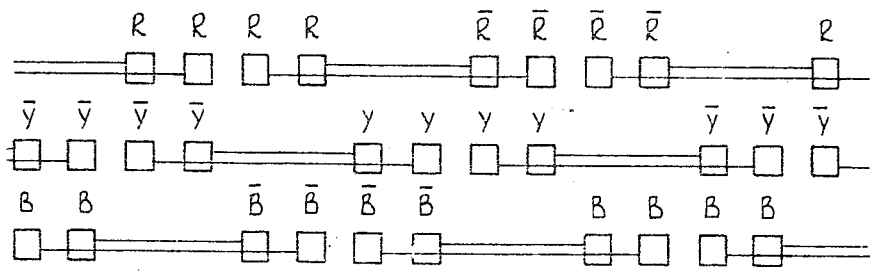
Figure 11:
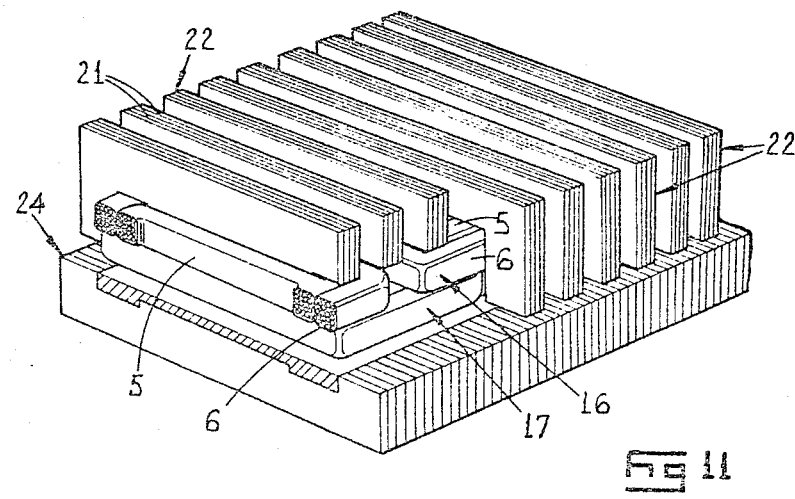
Figure 12:
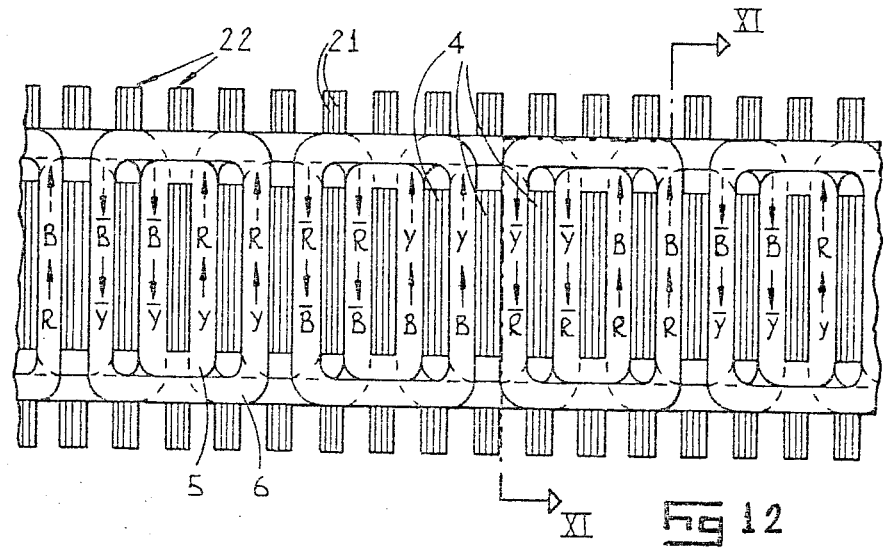
Figure 13:
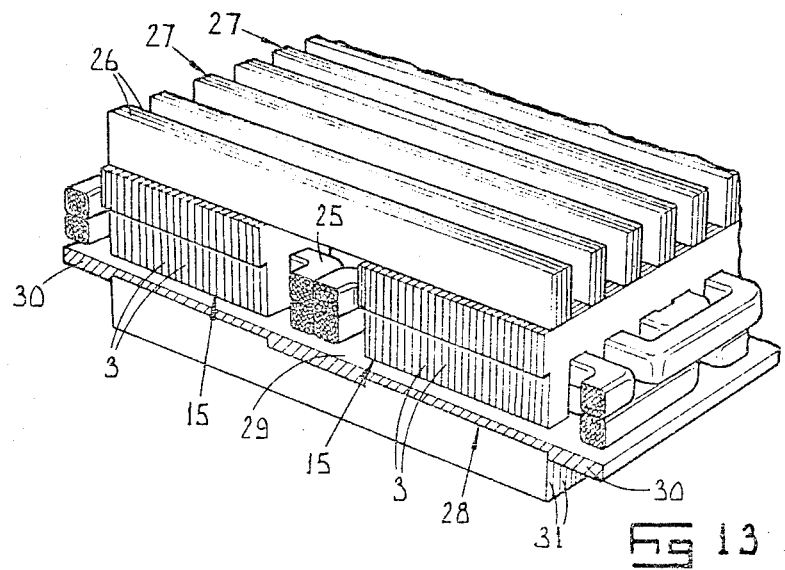
Figure 14:
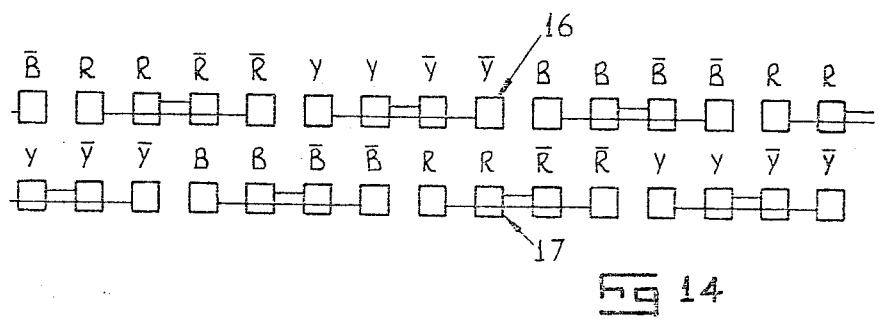

In order that the invention may be more fully understood 11 embodiments of the invention will now be described, by way of example, with reference to the accompanying drawings, in which:

FIG. 1 is a perspective view of part of the linear induction motor forming the first embodiment, as seen on the section I—I of FIGS. 2 and 3. The stator has been cut away to show part of the three-phase winding with which it is formed, FIG. 2 is a simplified underside view (not to scale) of part of the stator of the induction motor of FIG. 1, illustrating the arrangement of the three-phase winding, FIG. 3 is a symbolic representation of a part of the three-phase winding of FIGS. 1 and 2, FIG. 4 illustrates, in the symbolic notation of FIG. 3. the winding arrangement of the second embodiment, FIG. 5 similarly illustrates the winding arrangement of the third embodiment, FIG. 6 illustrates the winding arrangement of the fourth embodiment, FIG. 7 illustrates the winding arrangement of the fifth embodiment, FIG. 8 illustrates the winding arrangement of the sixth embodiment, FIG. 9 illustrates the winding arrangement of the seventh embodiment, FIG. 10 illustrates the winding arrangement of the eighth embodiment, FIG. 11 is a simplified perspective view similar to FIG. 1 of the linear induction motor forming the ninth embodiment, as seen on the section XI—XI of FIG. 12, FIG. 12 is an underside view similar to FIG. 2 of the stator of the linear induction motor of FIG. 11, FIG. 13 is a simplified perspective view similar to FIG. 1 of the linear induction motor forming the 10th embodiment, FIG. 14 shows the eleventh embodiment in which the polyphase winding is the same as that of FIGS. 1 to 3 but the winding groups are differently energized to give twice the pole number, and FIG. 15 indicates an important application of the invention.

Referring now to FIGS. 1 and 2, the first linear induction motor has its stator 1 and rotor 2 mounted in spaced relationship for relative movement in the direction of the arrow A (FIG. 1).

The stator comprises a continuous stack 15 of longitudinally extending magnetic laminations such as are indicated at 3, formed at its face opposed to the rotor 2 with transverse winding slots so as to define regularly spaced and identically dimensioned teeth 4 of which two are indicated in FIG. 1.

The three-phase energizing winding for the motor is formed of a plurality of bobbin-type windings having equal numbers of winding turns of a circular-section, insulated conductor. These windings are wound on the stack 15 in two similar, superimposed and contiguous winding layers 16 and 17 of which 16 is the upper winding layer. Each winding has its winding conductors received in two of the winding slots and has its winding ends interconnecting the winding conductors extending along the sides of the stack 15 at the ends of the teeth 4.

In each winding layer the windings are arranged in groups of associated inner and outer windings respectively denoted by the reference numerals 5 and 6. The inner winding of each group encompasses one of the teeth 4 while the outer winding is disposed outside the inner winding so as to encompass the teeth 4 encompassed by the inner winding, together with the adjacent tooth on either side.

Where appropriate, shaped spacing pieces of insulating material are provided within each outer winding 6 at the ends of the teeth 4 so that the outer winding is held firmly in position around its inside periphery. For clarity these spacing pieces are omitted.

In each winding group the inner and outer windings are formed continuously with one another or otherwise interconnected in series for creating magnetomotive forces which are additive.

For each phase the winding groups of the two layers are interconnected either in series, series-parallel or parallel as desired. The three windings so formed are connected in star or, possibly, delta to form the three-phase winding.

Each winding 5 and 6 is flat and lies in a plane which is common to the other winding of the group as well as to the other windings in the same winding layer. The common plane of each winding layer is parallel to the general plane of the rotor 2.

FIG. 2 is an underside plan view of part of the stator. From FIG. 2 it will be seen that, from left to right as shown, each winding layer comprises winding groups belonging to the phases taken in the rotation red, yellow and blue.

For each phase the winding groups in one winding layer are offset from the winding groups of the other winding layer through six of the teeth 4. Thus alternate ones of the teeth 4 are encompassed in common by, and therefore magnetically associated with, the outer windings of two winding groups from different layers and belonging to different phases.

In addition to the stack 15 of the stator 1 also comprises, as a further part of the motor magnetic circuit, further laminations such as are indicated at 10. These laminations are U-shaped and each extend transversely of the motor. They are provided over the whole length of the stator, either continuously as shown, or alternatively in discrete, longitudinally spaced, lamination stacks.

Transversely of the motor the laminations 10 are arranged symmetrically with respect to the stack 15, and it will be seen from FIG. 2 that at the sides of the motor the laminations 10 abut the outer windings 6 and so help to secure the three-phase winding in position.

The rotor 2 has a plane upper face 7 opposed to the stator and comprises a cast aluminum reaction plate 11 inset into a backing member formed of transverse magnetic laminations 12.

The laminations 12 are of the same width, laterally of the motor, as the laminations 10, and provide the parts of the face 7 opposed to the free end faces 8 of those laminations. Between those parts the face 7 is provided by the plane top surface of the reaction plate, the reaction plate being formed of a web part 14 where it opposes the teeth 4 and, on each side of the web part 14, side parts 13 which correspond laterally to the longitudinally extending gaps 9 accommodating the winding ends of the windings 5, 6. As will be seen from the drawing, the side parts are substantially deeper than the web part.

In operation the three-phase winding is energized from a three-phase AC supply and in known manner each winding layer separately generates a magnetic field which travels longitudinally of the primary member from left to right as shown in FIG. 2. For each phase the winding groups of one winding layer are energized in the opposite sense to the winding groups of the other winding layer, but owing to the spatial displacement of the two winding layers by an odd number of pole pitches the two magnetic fields are directly in phase with one another and are therefore additive to produce a combined magnetic field having approximately twice the amplitude of each individual magnetic field.

In each winding layer three successive winding groups, i.e., one for each phase, represent two pole pitches (360 electrical degrees) of the combined magnetic field, and it will be appreciated that in this, as in the other embodiments of the invention, the three-phase winding extends longitudinally of the motor so as to give as many magnetic poles as desired.

As a result of the combined magnetic field, working flux is caused to pass between the stator and the rotor in magnetic paths which are orientated longitudinally of the motor in vertical planes and also in further magnetic paths which are orientated transversely of the motor and are provided side-by-side in pairs. Flux in the longitudinal paths passes from the laminations 3 via teeth 4 downwards through aluminum conductor 11 and then longitudinally along backing member 12 to return to the laminations 3 via the conductor 11 and further ones of the teeth 4.

Because they are transverse to the laminations 12 so that the flux in them can induce substantial eddy currents in the planes of the laminations, the longitudinal paths have a high AC reluctance. In addition, the parts of the laminations 3 bridging the teeth 4 are dimensioned to saturate at a low level of flux. For these reasons the magnitude of the flux in the longitudinal paths is small. One of the main reasons for providing the longitudinal laminations is to enable pole shoes to be easily provided so as partially to close the winding slots below the three-phase winding. Although such pole shoes are not shown, they may be provided if desired.

The major part of the working flux passes in the transverse magnetic paths which, compared to the longitudinal paths, are of low AC reluctance. From the teeth 4 the flux in each transverse magnetic path passes downwardly through the aluminum conductor and then transversely through the backing member 12 to return to the stack 15 via the respective arm of the laminations 10. It will be noted that flux flow in the backing member is along the laminations and so is in their low reluctance direction. It will also be noted that a part of each pair of side-by-side transverse paths is provided in common by the stack 15.

The passage of the working flux through the aluminum conductor 11 induces currents to circulate within it. These currents flow in a horizontal plane in a rectangular pattern which corresponds generally to the magnetic poles formed by the stator. Each such rectangular current path has two of its sides provided by the web part 14 of the aluminum conductor 11 and has its other two sides provided by the side parts 13 thereof.

The propulsive force to produce the desired relative movement of the stator and rotor members is created in known manner by the electromagnetic interaction of the working flux with the currents in the conductor 11. It will be noted that both the longitudinal and transverse magnetic paths are effective to produce propulsive force.

It will also be noted that in this embodiment, as in the other embodiments shown in the drawings and later to be described, the three-phase winding is disposed wholly within the confines of the stator magnetic material. The winding is received in a network of slots in the form of a ladder and comprised of the two longitudinal slots formed between the ends of the teeth 4 and the outer limbs of the laminations 10 and, extending transversely between these two slots at regular intervals, the winding slots between adjacent teeth 4. In operation the magnetic material will therefore act to shield the winding from debris which may be thrown up from off the rotor.

In a modification the bobbin-type windings 5, 6 are formed from insulated strip conductor wound on edge or otherwise.

The invention is not limited to the particular winding arrangement shown and described with reference to FIGS. 1 and 2, and FIGS. 4 to 10 and 14 illustrate further possible winding arrangements. For brevity these further winding arrangements are represented symbolically using the symbolic notation of FIG. 3 which represents the winding arrangement of FIGS. 1 and 2.

In FIG. 2 current flow in the winding conductors towards the top of the page is considered to be positive and towards the bottom of the page is considered to be negative. To indicate the phase to which the winding conductor belongs the phase initial is used. The direction of current and appropriate phase are represented in combination by a bar over the phase initial if the current is negative, and no bar if the current is positive. Thus R represents a positive current in the red phase and $\overline{Y}$ represents a negative current in the yellow phase.

In FIG. 2 it is assumed that at the instant of time illustrated all the right-hand winding conductors of the bottom layer 17 of winding groups are taking positive currents and all the left-hand winding conductors of those groups are taking negative currents, and vice versa for the top winding layer 16. In reality, of course, this will not happen. When, for example, the current in a red phase winding group of a winding layer is a maximum and in the sense shown, the currents in the yellow and blue winding groups of the layer will be in the opposite senses to those shown.

In FIG. 3 the blocks represent the winding conductors and are spaced apart in accordance with their physical spacing. Blocks which are interconnected represent winding conductors which form the two sides of the same winding. Each block is marked with the appropriate current direction and phase using the notation described above.

Using the notation, FIG. 4 illustrates the winding of the second embodiment of the invention which has the magnetic core structure of the first embodiment and which is identical to the first embodiment in so far as its two winding layers 16 and 18 are concerned. However, whereas in the first embodiment the winding layers are arranged to generate fundamental magnetomotive forces which are exactly in phase (so that the winding groups in one winding layer are spaced longitudinally of the motor by an odd number of pole pitches from the winding groups of the same phase in the other winding layer), in FIG. 4 the winding layers are offset through one tooth 4 from this relationship. Although the offsetting is shown to be in one particular direction—the bottom winding layer is shifted to the left—the other direction of offsetting may be used if desired.

The harmonic content of the magnetic field of the second embodiment differs from that of the first embodiment and for some applications this difference may make the arrangement of FIG. 4 preferable to that of FIGS. 1 to 3. However, the second embodiment has the disadvantage that the fundamental magnetomotive forces of the two winding layers are not exactly in phase with one another so that the maximum flux which they produce in combination is slightly reduced.

Figure 5:
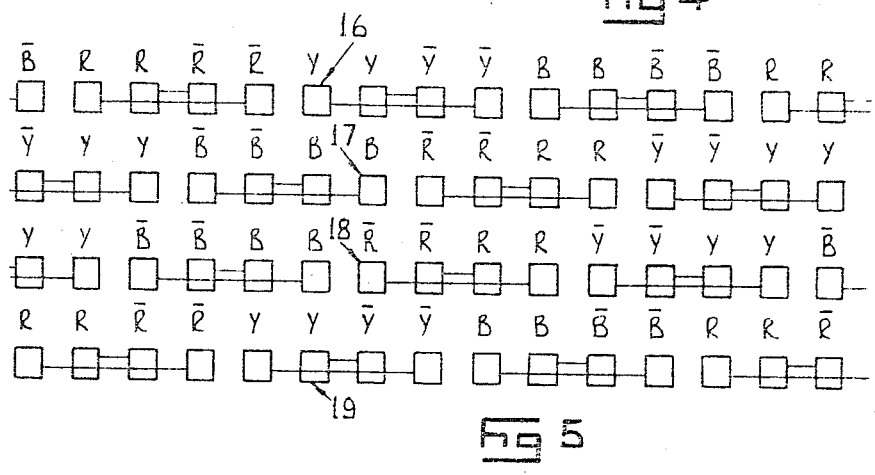

FIG. 5 illustrates the third embodiment of the invention, in which the travelling magnetic field has a lower harmonic content than that of any embodiment so far described.

The three-phase winding is arranged in four superimposed and contiguous winding layers each similar to the winding layers of the first two embodiments. The upper two winding layers are in the same relationship as the layers of the first embodiment and are therefore indicated by the reference numerals 16 and 17; likewise the third layer has the same relationship to the layer 16 as has the layer 18 of FIG. 4 to the layer 16 of that Figure; accordingly, the third layer is given the reference numeral 18. The fourth layer 19 is in the same relationship to the layer 17 as is the third layer 18 to the layer 16; thus the winding groups of the layer 19 are offset to the left by one tooth from a position which is an odd number of pole pitches from the corresponding winding groups of the layer 17, and are energized oppositely to those winding groups. The windings 5 and 6 of all the winding layers have the same number of winding turns.

In all the embodiments of the invention shown and described the pitch of the teeth 4 should be small enough to give a good rotor current distribution longitudinally of the motor and yet which should not be so small that the requirements of ease of manufacture and assembly, mechanical strength, adequate insulation levels, cooling, etc., difficult or impossible to meet.

The rotor current distribution is dependent upon the airgap magnetically separating the rotor and the stator, and it has been found that, subject to the mechanical requirements mentioned above, for good rotor current distribution the tooth pitch (i.e., the distance between tooth centers) should be twice the airgap or less.

Typically the value of tooth pitch is 2 inches, and with a tooth pitch of this value (and hence a pole pitch of 1 foot) the linear induction motors of the embodiments of FIGS. 1 to 5 would have synchronous speeds of approximately 130 k.p.h. when fed at 60 cycles per second. The vehicle speed is, of course, lower than the motor synchronous speed and at a slip of 0.2 would then be approximately 100 k.p.h.

In order to achieve higher vehicle speeds while still using the desirable value of tooth pitch mentioned above, each winding group may be constituted by an appropriately increased number of windings. FIG. 6 shows one such winding arrangement which, with the same frequency of supply and the same tooth pitch, would give a vehicle speed approximately 1.5 times that of the first three embodiments.

Referring now to FIG. 6, the fourth embodiment of the invention is a modification of the first embodiment in which each winding group is constituted by three series-connected windings one within the other. The center one of these windings encompasses one tooth 4, the middle one encompasses this tooth together with the two adjacent teeth, and the outer winding encompasses the three teeth encompassed by the middle winding together with the two teeth adjacent thereto. All the windings in FIG. 6 have the same number of winding turns.

The increase in the number of windings per winding group in this way enables correspondingly higher vehicle speeds to be obtained, but it also correspondingly accentuates such factors of the harmonic content of the magnetic field and the lateral slot width required for accommodating the winding ends. In order to reduce these to some extent, one or more of the innermost windings of each winding group may be omitted, as is illustrated in FIG. 7, which shows the fifth embodiment of the invention to be the winding arrangement of FIG. 6 modified by the omission of the innermost winding of each winding group. It should be appreciated that FIG. 7 is only illustrative of the concept of omitting one or more windings of a winding group; it is believed that only with winding groups formed of a much higher number of windings, e.g., eight or more, is the omission of one or more of the innermost windings an advantage.

In all the embodiments so far described the separate windings forming each three-phase winding have equal numbers of winding turns. If desired, however, the number of winding turns within a winding group may differ so that, for example, a grading effect is achieved.

FIG. 8 shows the sixth embodiment of the invention which is a further modification of the winding arrangement of FIGS. 1 to 3. Instead of the windings 5 and 6 having the same number of turns and having their winding conductors individually received in the winding slots, in the sixth embodiment the outer windings have half the number of turns of the inner windings and share winding slots with the outer windings of the adjacent winding groups, being disposed side-by-side therewith. Such an arrangement, which may also be used for the other embodiments of the invention, results in a smaller ratio of magnetic pole pitch to effective length of winding group and has advantage in some applications.

The embodiments so far described have each winding layer formed of winding groups belonging to the phases taken in rotation. However, the invention is not limited to such an arrangement. It is envisaged, for example, that at least one of the winding layers of a polyphase winding of an induction motor stator in accordance with the invention could be formed of winding groups belonging to two or more, but not all, of the phases. Thus a three-phase winding might at least partly be disposed in winding layers respectively formed of winding groups taken from the phases red and yellow, yellow and blue, and blue and red.

Another possibility is to have winding layers exclusively formed of winding groups from one phase, and two further embodiments having such an arrangement are now to be described with reference to FIGS. 9 and 10.

Referring now to FIG. 9, the seventh embodiment has a three-phase winding arranged in three superimposed layers, one for each phase. Each layer is devoted exclusively to its respective phase and is formed of winding groups which are energized alternately in opposite senses. Each winding group is constituted by three bobbin-type windings one within the other, as previously described in relation to FIG. 6.

In order for the winding layers in combination to generate the desired travelling magnetic field, the layers are offset from one another through four teeth 4 so as to give the required 120° (electrical) spacing between phases.

The techniques disclosed in FIGS. 7 and 8 are also applicable to an arrangement of the kind shown in FIG. 9 in which each winding layer is devoted to one phase. FIG. 10 shows the eighth embodiment of the invention to be the arrangement of FIG. 9 modified by the omission of the center winding of each winding group.

The embodiments described above each have the magnetic core structure shown and described in relation to the first embodiment; the invention, however, is in no way limited to such a core structure and other core structures may be used.

In a modification of each of the embodiments of FIGS. 1 to 10, the transverse laminations 10 are omitted and the laminations 3 are dimensioned to carry the whole magnetic flux without saturation. Substantially the whole working flux then passes in a magnetic path which is longitudinal of the motor. The rotor 2 is suitably modified by the provision of longitudinal, as opposed to transverse laminations.

FIGS. 11 and 12 show a further magnetic core structure which may be used. For convenience, this core structure is shown in combination with the winding arrangement of the first embodiment, but it will be appreciated that it may be used with any of the other winding arrangements.

Referring now to FIGS. 11 and 12, in the ninth embodiment of the invention the stator core structure is formed of E-shaped laminations 21 which are transversely orientated and arranged in laminations stacks 22. Longitudinally of the motor the stacks 22 are of equal extent and are held at a regular spacing by insulating struts which are not shown.

The laminations are arranged as shown with their teeth 4 facing the rotor 24 which is exactly the same as the secondary member 2 of FIG. 1. For magnetization the laminations 21 are formed with a three-phase winding in the winding arrangement of FIGS. 1 to 3, as can be clearly seen in FIG. 12 which shows an underside plan view of part of the stator.

It will be appreciated that substantially all the working flux passes in a magnetic path which is transverse of the motor.

In a modification of the magnetic core structure of FIGS. 11 and 12, longitudinally orientated laminations are disposed either between or above the stacks of transverse laminations for providing part of a longitudinal path for magnetic flux. The effect of these longitudinal laminations is to increase the inductive impedance presented to currents which flow transversely across the motor between, as opposed to beneath, the stator teeth, and thereby to encourage the currents to flow immediately beneath the teeth where they are effective to produce propulsive force.

FIG. 13 shows yet another core structure which for convenience is shown in combination with the winding arrangement of the first embodiment but which may be used in combination with any of the other described winding arrangements.

Referring now to FIG. 13, in the 10th embodiment of the invention the linear induction motor stator has two stacks of longitudinally orientated vertical magnetic laminations 3, each stack being identical to the stack 15 of FIG. 1 and being accordingly given the same reference number.

Each stack 15 is formed with a three-phase winding which is exactly as previously described with reference to FIG. 1. The two stacks 15 extend longitudinally of the stator in spaced and parallel relationship, and in the longitudinally extending gap 25 formed between them are accommodated the inner winding ends of their three-phase windings.

The gap 25 is magnetically bridged by transversely orientated magnetic laminations 26 which abut the top faces of the stacks 15 and are of a length to extend between the outermost side faces thereof. The laminations 26 are disposed in discrete, longitudinally spaced lamination stacks 27; in a modification they extend continuously along the stator in the manner of the laminations 10 in FIG. 1.

Like the rotor 2 of the first embodiment, the rotor of this embodiment of the invention has a plane upper face and comprises an electrically conductive reaction plate backed by a backing member of transverse magnetic laminations and of a width which corresponds to the width of the stator magnetic structure. The rotor of FIG. 13, however, differs from the rotor 2 of the first embodiment in that the reaction plate 28 provides the whole of the plane upper face 29, projecting laterally beyond the rotor (and stator) magnetic structures at overhanging portions 30. The overhanging portions 30 and the part of the reaction plate 28 opposite to the gap 25 are substantially thicker than the parts of the reaction plate opposite the lamination stacks 15.

For operation the three-phase windings of the two stacks are energized from a three-phase AC supply so as to create fields of magnetomotive force which travel along the motor in the same direction and at the same speed. The two fields are directly in antiphase with one another transversely of the motor, so that the two three-phase windings of the stacks 15 act additively to drive flux around the transverse low reluctance paths provided in combination by the stator laminations 3, 26 and the rotor laminations 31. In the known and previously described manner, this flux in turn produces propulsive force by interaction with the currents which it induces in the reaction plate 28.

The thickened portions 30 of the reaction plate serve the same function as the side parts 13 of the reaction plate 11 of FIG. 1, likewise providing the longitudinally extending sides of the rotor current paths.

In an analogous manner to the first embodiment each stack 15 individually drives flux around the stator/rotor magnetic circuit in flux paths which are orientated in longitudinal, vertical planes; for the reasons previously given in relation to the first embodiment, however, this longitudinal flux will be limited in magnitude and its contribution to the total propulsive force will be small.

In all the embodiments described above, pole-changing means may be provided for varying the pole number so as to change the synchronous speed of the motor, as is well known in the induction motor art. For example, the pole number of the first embodiment may be doubled if the winding groups of one of the winding layers are reconnected for energization in the opposite sense, as is shown in FIG. 14. Likewise, the pole number of the embodiments of FIGS. 9 and 10 can be doubled by reversing alternate winding groups in each winding layer.

Although described in relation to pole-changing it will be appreciated that windings energized as described in connection with FIG. 14 may be used in their own right, i.e., without pole-changing means, in a linear induction motor stator in accordance with the invention.

Whereas the stators shown in the drawings are all one-sided it will be appreciated that the invention is also applicable to double-sided linear induction motors, in which the rotor comprises an outstanding member of electrically conductive material and the stator has two parts disposed at either side of the rotor and arranged in operation additively to drive flux around the magnetic paths linking the stator parts and the rotor therebetween.

In all the described embodiments, the windings forming each polyphase energizing winding are flat and coplanar with the other windings of the same winding layer. Because of the absence of cranked winding ends, the motor can usually be narrower and therefore less expensive than if cranked winding ends had been provided. This is particularly of importance for arrangements (such as those shown and described) in which the magnetic core structure extends laterally of the polyphase winding so as to provide in part transverse paths for working flux. The invention is, however, not limited to wholly flat windings, and each winding layer may comprise windings which are not wholly coplanar.

Winding groups belonging to the same phase may be connected in parallel, series-parallel or series as desired. Within each winding group the constituent windings are most likely to be connected in series; parallel connection of windings within a group, although possible, is likely to be less satisfactory than series connection because of circulating current losses.

The stator magnetic core structures shown in the drawings all have teeth which are regularly spaced and of equal extent longitudinally of the motor. However, the invention is not limited to such core structures, and core structures in which the teeth are irregularly spaced and/or of differing extent longitudinally of the motor may be used in some applications of the invention.

Also, it is not essential for two adjacent windings forming part or all of a winding group to be separated magnetically by two teeth one in front of, and the other behind, the inner of the two windings. It is envisaged that two such windings may be separated by only one tooth.

As previously described in relation to the first embodiment, the teeth may be formed with pole tips so that the winding slots longitudinally and/or transversely (if appropriate) of the motor are partly closed. The pole tips may be integral with the teeth or they may be formed separately and suitably attached.

The polyphase winding for a linear induction motor stator in accordance with the invention may have a phase number other than three and may be arranged in two or more winding layers in any desired order.

A linear induction motor in accordance with the invention is in no way limited to the particular orientation shown for the described embodiments.

Figure 15:
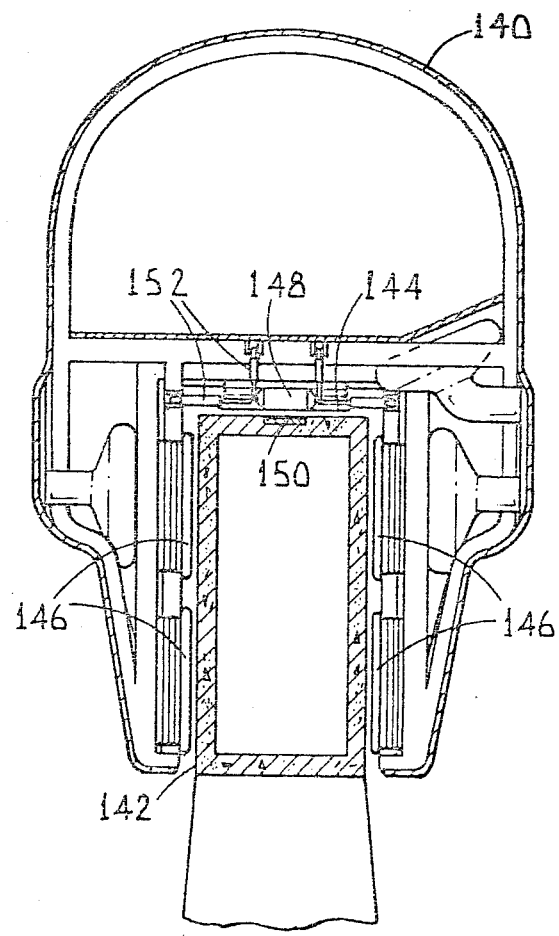

FIG. 15 shows the invention as applied to a high-speed transport system in which a vehicle 140 is supported by a cushion of air formed by a pad 144 to ride at a high speed over a prepared concrete track 142 of rectangular cross section. Guidance for the vehicle is provided by further air cushion pads 146. Propulsive force for the vehicle is provided by a single-sided linear induction motor having a stator in accordance with the invention and indicated by the reference numeral 148. The rotor 150 for cooperation with the stator is in the form of a conductive plate and associated magnetic backing material extending horizontally along the track.

I claim:

1. A linear induction motor comprising a primary member and a secondary member arranged transversely of one another for relative longitudinal movement therebetween, said primary member comprising magnetic material having a plurality of teeth spaced longitudinally of the motor in opposition to the secondary member and separated from one another by winding slots therebetween, and polyphase energizing winding means for the motor, the winding means comprising, for each phase and for each pole pair of the motor in operation, a plurality of winding groups arranged in at least two winding layers and each comprising at least two windings arranged one within the other, of each two successive windings of each winding group the inner one encompassing at least one of the teeth for generating magnetic flux therein and the outer one encompassing each said tooth encompassed by the inner winding together with at least one of the two adjacent teeth for generating magnetic flux therein, each winding being at least substantially planar and in each winding layer the constituent windings lying at least substantially in a common plane.

2. A linear induction motor according to claim 1, wherein the winding means is at least in part arranged in a first winding layer and a second winding layer, the first and second winding layers being each comprised of said winding groups belonging to the phases taken in rotation, for each phase the winding groups in the two said layers being arranged to produce magnetomotive forces which are of opposite sense, each winding group in one said layer being spaced longitudinally of the motor by an odd number of pole pitches from each winding group of the same phase in the other said winding layer.

3. A linear induction motor according to claim 1, wherein the winding means is at least in part arranged in a first winding layer and a second winding layer, the first and second winding layers being each comprised of said winding groups belonging to the phases taken in rotation, for each phase the winding groups in the two said layers being arranged to produce magnetomotive forces which are of opposite sense, each winding group in one said layer being offset by one tooth from a position which, in relation to each winding group of the same phase in the other said winding layer, is spaced longitudinally of the motor by an odd number of pole pitches.

4. A linear induction motor according to claim 2, wherein in addition to the first and second winding layers, the winding means is arranged in third and fourth winding layers each comprised of said winding groups belonging to the phases taken in rotation, for each phase the winding groups in the third and fourth winding layers being arranged to produce magnetomotive forces which are of opposite sense to those produced by the winding groups in, respectively, the first and second winding layers and being each offset by one tooth from a position which, in relation to each winding group of the same phase in the respective first or second winding layer, is spaced longitudinally of the motor by an odd number of pole pitches.

5. A linear induction motor according to claim 1, which includes a said winding layer which is exclusively formed of one or more winding groups of one phase of the winding means.

6. A linear induction motor according to claim 5, wherein the said winding layer has a plurality of winding groups successively arranged to produce magnetomotive forces alternately of one sense and of the opposite sense.

7. A linear induction motor according to claim 5, wherein each winding layer is exclusively formed of, and exclusively forms, a respective one of the phases of the winding means.

8. A linear induction motor according to claim 1, wherein in each winding group the innermost winding encompasses one tooth and each successive said winding towards, and including, the outermost winding encompasses the two teeth adjacent the one or more teeth encompassed by the next inner winding.

9. A linear induction motor according to claim 1, wherein in each winding group the innermost winding encompasses a plurality of teeth and each successive said winding towards, and including, the outermost winding encompasses the two teeth adjacent the teeth encompassed by the next inner winding.

10. A linear induction motor according to claim 1, wherein the windings of the winding groups are formed with equal numbers of winding turns.

11. A linear induction motor according to claim 1, which includes a winding group of which the constituent windings have differing numbers of winding turns.

12. A linear induction motor according to claim 1, wherein each winding slot receives the winding conductor of only one said winding of each winding layer.

13. A linear induction motor according to claim 1, which includes two successive winding groups in the same winding layer having the adjacent winding conductors of their outermost windings received side-by-side in the same winding slot.

14. A linear induction motor according to claim 1, wherein the primary member magnetic material is at least partly comprised of a magnetic structure which extends continuously along the primary member in opposition to the secondary member and is formed with the said teeth and the winding slots therebetween at its face opposed to the secondary member, the primary and secondary members being so arranged and relatively disposed that the magnetic structure provides part of a longitudinally oriented path for working flux.

15. A linear induction motor according to claim 1, wherein the primary member magnetic material is at least partly comprised of a plurality of magnetic structures which are spaced apart longitudinally of the motor and each of which opposes the secondary member at at least two spaced paths thereof, the said teeth being each comprised of a said magnetic structure part and the winding slots being constituted by the spaces between the magnetic structures, the primary and secondary members being so arranged and relatively disposed that each magnetic structure provides part of a transversely orientated path for working flux.

16. A linear induction motor according to claim 14, wherein the primary member magnetic material is further comprised of a second magnetic structure in addition to the first, and second magnetic structure extending from the first magnetic structure to oppose the secondary member at at least one further face spaced transversely of the motor from the first said face, the primary and secondary members being so arranged and relatively disposed so that the first and second magnetic structures in combination provide part of a transversely orientated path for working flux.

17. A linear induction motor according to claim 16, wherein the first magnetic structure is so dimensioned that the part of the longitudinally orientated path which it provides saturates at a level of flux such that the longitudinally orientated working flux contributes only a small proportion of the total propulsive force.

18. A linear induction motor according to claim 16 wherein the second magnetic structure comprises a further said first magnetic structure having its said teeth and winding slots formed at the said further face, and a plurality of magnetic bridging members magnetically bridging the space between the two said first magnetic structures, the winding means formed on the two first magnetic structures being arranged to act in antiphase so as additively to drive working flux around the transversely orientated path.

19. A linear induction motor according to claim 16, wherein the second magnetic structure comprises a plurality of magnetic members which extend to either side of the first magnetic structure to their free ends at which they oppose the secondary member, the primary and secondary members being so arranged and relatively disposed that the first and second magnetic structures in combination provide parts of two said transversely orientated paths for working flux side-by-side, the two said paths comprising the first magnetic structure in common.

20. A linear induction motor according to claim 1, wherein the pitch of the said teeth is at the most, twice the airgap magnetically separating the primary and secondary members.

21. A gas cushion vehicle adapted to be propelled along a prepared track by a linear induction motor as claimed in claim 1.

* * * * *